SYNCHRONIZING SERVOSYSTEM WITH MEMORY MEANS

Filed June 7, 1967

INVENTORS
GEORGE V. JACOBY &
JOHN C. KMIEC

BY Edward J. Norton
ATTORNEY 3,520,993

SYNCHRONIZING SERVOSYSTEM WITH MEMORY MEANS

George V. Jacoby, Bala-Cynwyd, Pa., and John C. Kmiec, Runnemede, N.J., assignors to RCA Corporation, a corporation of Delaware Filed June 7, 1967, Ser. No. 644,330
Int. Cl. H04n 5/78
U.S. Cl. 178—6.6 6 Claims

ABSTRACT OF THE DISCLOSURE

There is disclosed a servosystem for a video recorder-reproducer. The servosystem comprises a loop including a memory capacitor and an error amplifier with suitable lead-lag networks to be used with the headwheel servo commonly employed in such recorders-reproducers. The loop is switched in during animation or editing of the record medium to form a feedback loop around the headwheel servo to control the headwheel motor's velocity. The additional loop serves to minimize timing errors in the operation of the headwheel motor introduced by multiple splicing during animation or editing and, in general, errors introduced by the completing of short length splices in the record medium.

BACKGROUND OF INVENTION

Commercial television tape recorders and reproducers presently in widespread use are of the transverse track type. Four magnetic heads are spaced 90° apart about the periphery of a headwheel. A motor rotates the headwheel at approximately 14,400 revolutions per minute. A capstan motor drives a magnetic tape at approximately 15 inches per second past the headwheel which rotates in a plane perpendicular to the direction of tape movement.

Due to the nature of the signals recorded and reproduced by such equipment, there is a need for various types of servocontrol systems to minimize errors introduced during the recording-reproduction operation and to compensate for mechanical tolerances of the various motors used. For reference to the use of such servosystems, see, for example, U.S. 3,141,065 entitled Servosystem, issued July 14, 1964 by A. C. Luther, Jr. et al. and U.S. 3,270,130 entitled Servosystem With Plural Reference Signals, issued Aug. 30, 1966 by R. N. Hurst et al. Basically such servosystems perform the following functions when operated in their various modes. In a first mode, the servoloop associated with the capstan motor has circuitry which divides, using binary counters, a 240 cycle control track signal recorded on the magnetic tape to 30 cycles per second. This 30 cycle pulse is compared with a 30 cycle frame pulse derived from the local sync. The resulting error signal is used to frequency modulate a 240 cycle oscillator. The output of the oscillator is divided by four and the resulting 60 Hz. signal drives the capstan motor. In the above mode, framing is not a requirement and cannot be relied on if edit pulses are absent from the control track or following an incorrect mechanical splice in the tape.

When the recorder is started in the playback mode, a headwheel servo is connected so that the tonewheel is active as described in the above references. The headwheel servoloop compares the tonewheel signal with the field pulse derived from local sync. The headwheel motor is driven by power amplifiers to which is fed a 480 cycle signal that is amplitude modulated to control the motor speed. When the motor reaches a speed of 14,400 revolutions a minute, the output of the phase detector circuit that compares the tonewheel pulse to the reference 60

Hz. signal stabilizes. This loop of the servo brings the headwheel motor to the correct nominal speed.

In another or second mode, framing is a requirement and must be relied on even if edit pulses are not recorded on the tape, or have been incorrectly recorded, or following badly made splices. As in the first mode described above, as soon as the tape starts to move, the capstan motor locks up with the picture vertically framed. After video information is made available, in this mode, a reset for the binary counters is switched to a tape frame pulse assuring framing under all conditions. If edit pulses are absent from the tape, the phase of the counters is random at the beginning of the lock-up cycle. The reset action of the tape frame pulse causes the counted down control track pulses (30 Hz.) to be shifted in phase. This produces an error voltage at the phase detector which causes the modulated oscillator to apply the speed change information to the capstan motor. The speed change of the capstan causes "slipping" of the tape until framing is achieved. In this mode, the headwheel servo operates basically as described above.

In still a further or third mode which is a more accurate control mode, the unit goes through the above described second mode causing the headwheel to reach a velocity lock and the system begins aligning the tape vertical phase. The third mode aligns the tape signal more accurately such that in this mode it is necessary to hold alignment within less than one horizontal line. A variable delay generator is inserted in the path of the tonewheel phase detector circuit. This delay is a nominal delay of one headwheel revolution (4166 microseconds—domestic standards) and is modulated by the tape vertical alignment phase error signal in a manner to cause the headwheel servo to align tape vertical with reference or local vertical. Once this has been completed, a vertical coincidence gate and lock control logic switches out the vertical error signal and feeds a low frequency error signal representative of the phase difference between the tape horizontal and reference or local horizontal sync to the same variable delay generator. Thus this error acts through the headwheel servo to phase tape horizontal with reference horizontal, in much the same fashion the tape vertical alignment phase error is able to establish vertical alignment. At the same time, high frequency or velocity information derived from a phase comparison of the tape horizontal and reference horizontal is applied over a headwheel loop to the headwheel power amplifier via the headwheel modulator. Separate low frequency and high frequency gain controls and antihunt stabilizing networks optimize loop gain-phase characteristics as well as provide error signals for rapid system recovery during this mode. In this mode when horizontal lock or sync has occured, the tonewheel phase detector circuit and the above headwheel loop under horizontal error control are used simultaneously, thus, providing a compound loop arrangement which results in significant improvement in overall headwheel stability, jitter and recovery characteristics.

When a recorder/reproducer is to be employed for electronic splicing or animation, discontinuities of the tape sync result from the splicing or animation procedures. Even in the last described mode, the servosystem employed will force the headwheel to change its position to compensate for these discontinuities. Splicing or animation is accomplished by switching the unit from the above described accurate third or playback mode to a splicing or a editing record mode. During the record mode, the tape sync is no longer available and hence the headwheel seeks its own position as required by the alignment between the vertical reference sync and the tonewheel pulse train. Due to this realignment of the headwheel, a discontinuity, between the old and new recording, of the sync will result on the processed tape. In animation editing, a large number of short duration splices are made repeatedly. The length of such a splice can be as short as a single frame or less than one-thirtieth of a second. Each such splice then introduces a sync discontinuity on the tape which could compound in one direction so that the horizontal phase error voltage of the phase comparator or sampler used in the accurate above described third mode increases in value rapidly in a manner such that the servo employed in this mode would not be able to compensate for it during playback of the spliced tape.

It is therefore an object of the present invention to provide an improved servoloop capable of responding to discontinuities in a recorded signal produced by multiple splicing of the record medium.

A further object is to provide an improved servoloop for use in recorder-reproducers having a dnyamic response compatible with animation, splicing and editing of the record medium.

Still a further object is to provide an improved servoloop for use in recorder-reproducers capable of eliminating sync discontinuity due to short length multiple splices in the record medium.

SUMMARY OF THE INVENTION

According to a preferred embodiment of the invention, a transverse track recorder/reproducer of the type having a rotating headwheel to be operated in a splice or animation editing mode is provided with a relay or switching arrangement. The activation of the switch or relay disconnects a memory capacitor from the low frequency error amplifier employed in the headwheel servoloop of such recorders-reproducers and connects the memory capacitor in a separate loop comprising a phase sampler and an error amplifier with a double lead-lag network. The output of this error amplifier is applied to the memory capacitor through a large resistance selected such that the error voltage developed on this capacitor, before switching takes place, remains substantially constant during the relay activation. The additional loop compares the phase of tonewheel pulses representative of the headwheel's velocity with a reference pulse. The error signal developed maintains the headwheel in the same position it was in prior to activation of the switch. This headwheel position is representative of the charge on the memory capacitor. In this manner horizontal sync will be recorded on the tape without any discontinuity introduced by the spliced or animated tape and hence prevents the headwheel from seeking its own natural position.

DETAILED DESCRIPTION

Figure 1:
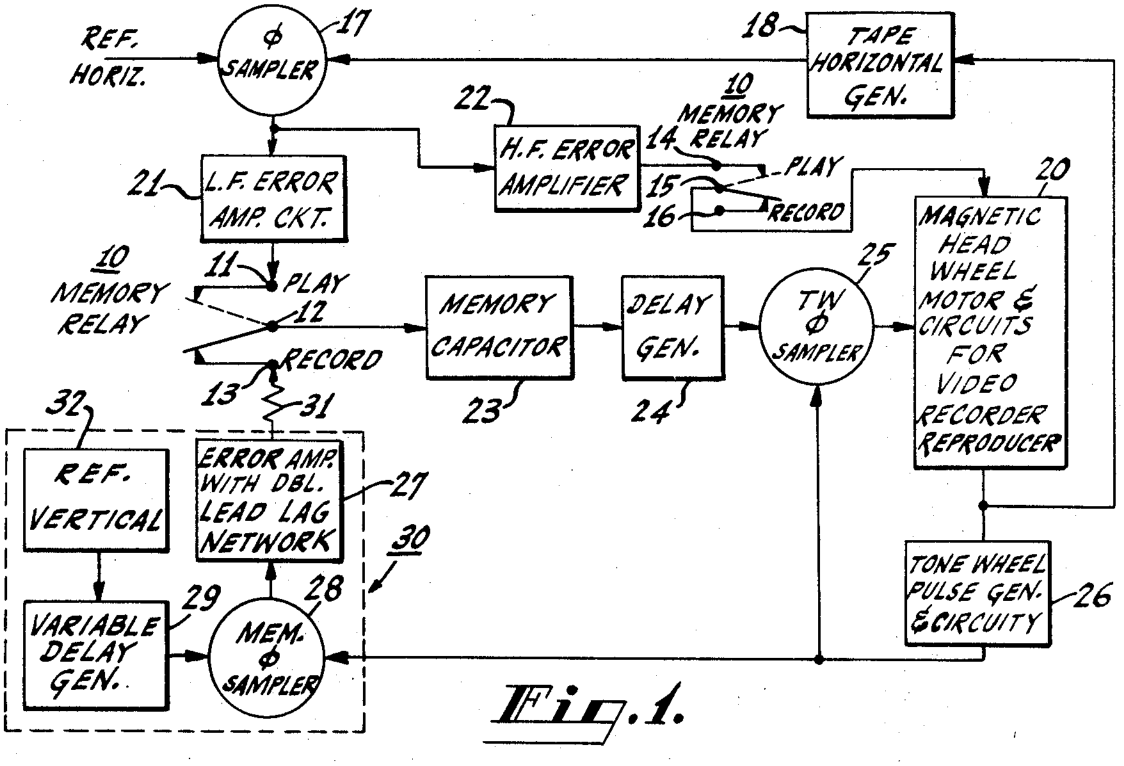
FIG. 1 is a functional block diagram showing a servoloop according to this invention incorporated into a recorder-reproducer.

If reference is made to FIG. 1, there is shown a relay or switch designated by numeral 10 and referred to as a memory relay. The relay 10 has two single-pole-double-throw portions, one designated as having center arm 12 and contacts 11 and 13, and the other having center arm 15 and contacts 14 and 16. In one position of the relay 10 designated as the PLAY or playback mode and shown by the dotted line representation of center arms 12 and 15 of relay 10, the recorder operates in an accurate servo mode, described above as the third mode, in which the tape horizontal sync is kept aligned with the reference horizontal sync. One input of a phase detector or phase sampler 17 is coupled to a reference horizontal signal source, not shown, and can be derived from a studio or "house" standard. The other input to sampler 17 is from the output of a tape horizontal generator 18. The tape horizontal generator 18 is coupled at its input to the video circuits included within the block 20, which block represents the headwheel assembly, controls and video processing circuits of a conventional television, transverse scan, magnetic tape recorder-reproducer. For a complete description of such circuits see, for example, the above cited references or a book entitled "Video Tape Recording," by Julian Bernstein, 1960, Rider Publisher Inc., New York.

The horizontal sync reproduced from the played back recorded signal is processed by the video circuits within the block 20 and shaped and amplified by the generator 18. The phase sampler or comparator 17 compares the phase of the reference horizontal with that of the tape horizontal and produces an error signal at its output which is representative of any phase difference therebetween. The output of the phase sampler 17 is coupled to the input of a low frequency or L.F. error amplifier 21 and to the input of a high frequency or H.F. error amplifier 22. The output of the L.F. error amplifier 21 is coupled to contact 11 of relay 10 which in the PLAY or playback mode couples through center arm 12 of relay 10 to the input terminal of a memory capacitor 23. The high frequency error amplifier 22 filters out the high frequency components of the error signal at the output of the phase sampler 17 and feeds the resulting-error signal directly to the headwheel modulator within block 20. This is accomplished in the playback mode by connecting the output of the H.F. error amplifier 22 to contact 14 of relay 10 and through the center arm 15 (dashed position) to the headwheel modulator within block 20.

The output of the L.F. error amplifier 21 charges the memory capacitor 23 through a low impedance path during the playback mode and the magnitude of this instantaneous charge serves to modulate the delay generator 24 whose output is coupled to one input of a tonewheel phase comparator or T.W. $\theta$ (phase) sampler 25. The other input to the tonewheel phase sampler 25 is from a tonewheel pulse generator 26 which operates from pulses provided by a suitable pickup associated with the headwheel assembly within the block 20 and timed according to the velocity of the headwheel. The tonewheel sampler 25 compares the output of the delay generator 24 with the tonewheel pulses from the generator 26, the resulting error signal being fed to the headwheel motor modulator within block 20 along with the output of the H.F. amplifier 22. Thus, the headwheel phase and velocity is controlled to maintain a high degree of alignment between the tape horizontal and reference horizontal. In the playback mode being described, the memory capacitor 23 which modulates the delay generator 24 is fed by the L.F. error amplifier 21 through a low impedance path and thus follows the low frequency components of the error signal provided by the phase sampler 17. The high frequency error components at the output of H.F. error amplifier 22 directly control the headwheel motor modulator and serve to optimize the loop grain-phase characteristics while further providing rapid recovery characteristics.

When relay 10 is caused to assume its Record or, in this case, splicing mode, the relay 10 serves to disconnect the H.F. error amplifier 22 from the headwheel motor modulator in block 20 by causing center arm 15 to move to contact 16, as shown by the solid line position of center arm 15 in FIG. 1. At the same time, the memory relay 10 disconnects the memory capacitor 23 from the output of the L.F. error amplifier 21 and connects the memory capacitor 23 to a memory servoloop enclosed within dashed line 30. Center arm 12 of relay 10 connects the memory capacitor 23 via contact 13 to the output of an error amplifier 27 containing a double lead-lag network for stabilization. One form of the amplifier 27 will be described in connection with FIG. 2. The output of the error amplifier 27 now feeds the memory capacitor 23 through a large resistance 31 whose magnitude is chosen so that, any error voltage developed on the capacitor 25 during the playback mode described above, does not "leak off" during the record or splice mode. The input of the error amplifier 27 is coupled to a memory phase sampler 28. The phase sampler 28 has one input connected to the output of the tonewheel pulse generator 26 and its other input connected to the output of a variable delay generator 29. The generator 29 is coupled to a suitable 60 or 240 cycle per second reference signal source 32. For example, the source 32 may include suitable means to derive a 240 cycle per second reference signal from the vertical local or reference sync signal otherwise used in the operation of the recorder-reproducer. The memory sampler 28 compares the delayed reference signal from the generator 29 with the tonewheel pulses from the generator 26 to provide at it's output an error signal whose amplitude is proportional to the difference between the phase of the delayed vertical reference signal and the tonewheel pulses. The stored charge on capacitor 23 together with the loop 30 assures that the headwheel velocity and phase will be maintained during the record or splice mode so that horizontal sync is recorded during this period in a manner permitting the later reproduction of the recorded signal free of discontinuities in the reproduced horizontal sync information which would otherwise appear in the reproduced signal.

Figure 2:
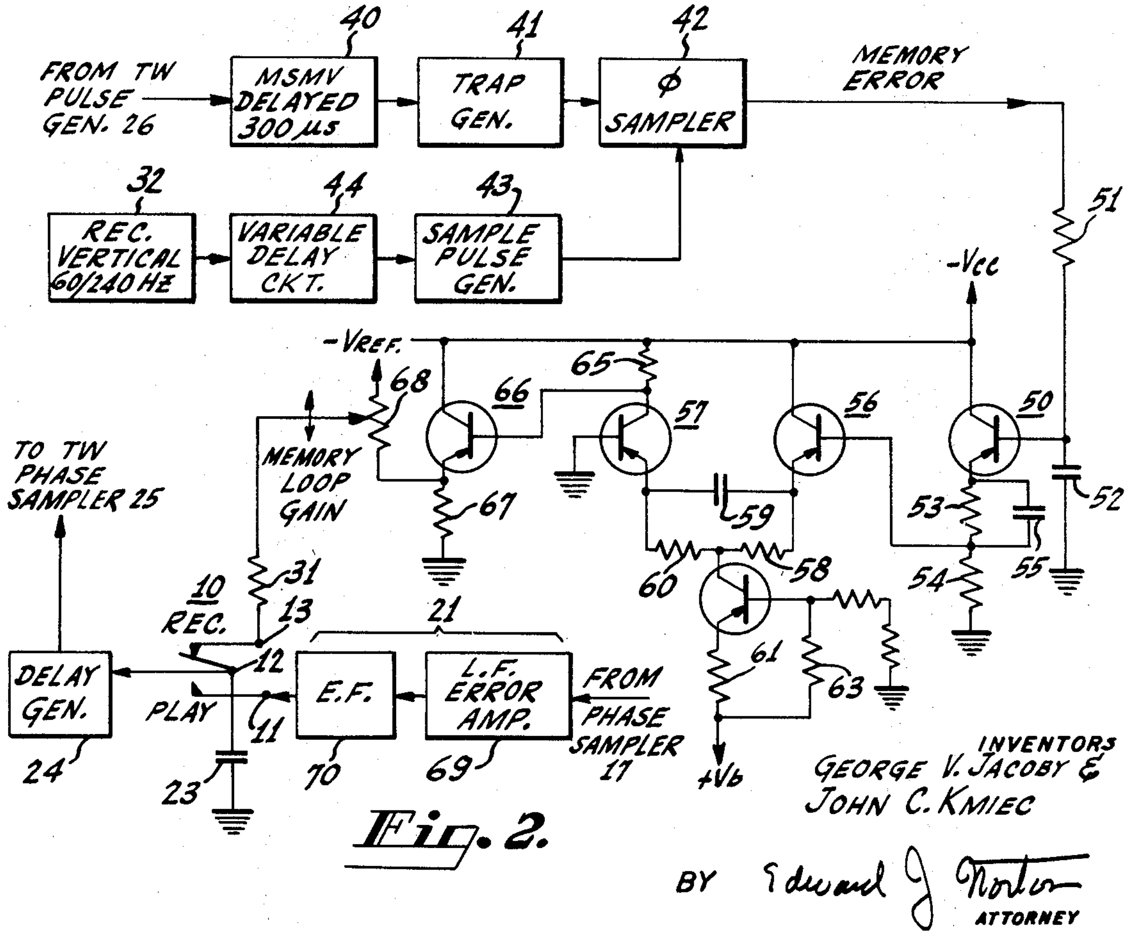
FIG. 2 is a partial block and partial circuit diagram of a servoloop according to this invention.

If reference is made to FIG. 2, there is shown a partial schematic and partial block diagram of one example of the memory servoloop 30 shown in FIG. 1. Similar numerals are used in FIG. 2 for elements corresponding to those described in FIG. 1. The output of the tonewheel pulse generator 26 of FIG. 1 is processed within the memory phase sampler 28 of FIG. 1 by first feeding the tonewheel pulses to a multivibrator 40 which delays the tonewheel pulses by approximately 300 microseconds to account for logic delay in the other path necessary to the phase sampling at the sampler 42. The delayed tonewheel pulses are fed from the output of multivibrator 40 to the input of a trapezodial generator 41 which serves to shape the pulses into a trapezoidal waveform. Such techniques can be found in the above references. The output of the trapezoidal generator 41 is coupled to one input of a phase sampler 42. The phase sampler 42 may be a diode bridge type phase detector or any other suitable device. The other input of the phase sampler 42 is supplied by a sample pulse generator 43 whose input is coupled to the output of the variable delay circuit 44. Techniques for obtaining variable delay are also known and understood in the art. The input to variable delay circuit 44 is a reference signal generated by the reference vertical source 32. The reference signal provided by the source 32 is delayed by the delay circuit 44 to align the reference signal for optimum sampling in the phase sampler 42, enabling a maximum error signal to be produced by the phase sampler 42. Variable delay generator 44 may be manually or electrically adjusted to give the desired delay. The delay circuit 44 and the sampler pulse generator 43, which could be a one-shot or Schmitt trigger, comprise the contents of block 29 of FIG. 1. The output of the phase sampler 42 is an error signal proportional to the phase difference between the delayed reference vertical and the tonewheel pulses.

The error voltage produced by the phase sampler 42 is directed to the base of a PNP transistor 50, which is wired in a common collector or emitter follower configuration, through a current limiting resistor 51. The base of the transistor 50 is also returned to a point of reference potential, such as ground, through a filtering capacitor 52, which forms a low-pass filter arrangement with resistor 51. The collector electrode of transistor 50 is returned to a source of bias potential —V*cc*. Coupled between the emitter of transistor 50 and ground is a series connection of two resistors 53 and 54. Resistor 53 is in parallel with a capacitor 55 which together with resistor 54 forms a lead-lag network for the memory error voltage coupled to the base of transistor

50. The network is included to improve the feedback control system response of the servo described herein. For an example of other suitable networks, see "Reference Data for Radio Engineers," I.T.T. Handbook, pages 358–360 (1957). The junction of resistors 53 and 54 is connected to the base of a PNP transistor 56 which is used in combination with a PNP transistor 57 in a differential amplifier circuit. The collector of transistor 56 is returned to —V*cc*. The emitter of transistor 56 is connected to one terminal of a biasing and current feedback resistor 58 and to one terminal of a capacitor 59. The other terminal of resistor 58 is connected to one terminal of a resistor 60 and is also connected at this point to the collector of a constant current PNP transistor 61. The other terminal of resistor 60 is connected to the emitter of transistor 57, as is the other terminal of capacitor 59. The combination of capacitor 59, and resistors 58 and 60 form a second lead-lag network in the emitter circuit of the differential amplifier which also serves to stabilize the servoloop gain. The base of transistor 57 is returned to ground, and the collector thereof is returned to —V*cc* through a load resistor 65. The constant current transistor 61 is biased by means of the divider comprising resistors 63 and 64 coupled to the base of the transistor 61 and the emitter resistor 62. One terminal of resistor 63 and of resistor 62 is returned to a source of bias potential designated as +V*b*.

The differential amplifier described possesses an exceptional balance between the amplifier inputs (those at the bases of transistor 57 and transistor 56) which results from the inherent match in base-to-emitter voltage and in short circuit current gain of the two transistors 56 and 57 which are closely matched. The circuit provides linear amplification and hence is useful for error amplifying circuits employed in servoloops. For more details on the operation of such circuits see, for example, Linear Integrated Circuit Fundamentals, Technical Series IC–40, RCA (1966), pages 8–59. The output at the collector of transistor 57 is coupled to the base of PNP transistor 66 which is in an emitter follower configuration. The emitter of transistor 66 is returned to ground through a load resistor 67 while its collector is connected to —V*cc*. The emitter of transistor 66 is also connected to one terminal of a potentiometer 68 whose other terminal is connected to a reference potential —V*ref*. The wiper arm of potentiometer 68 serves to control the gain of the memory servoloop by determining the magnitude of the voltage to be coupled to the memory capacitor 23 in the record or splicing mode. The wiper arm of potentiometer 68 is coupled to contact 13 of relay 10 through resistor 31 which resistor's value is selected as described above. Hence, in the splicing mode as shown by the position of relay 10, the delay generator 24 is under control of the memory servo loop, and by the error voltage developed in this loop which assures a minimum of discontinuity in tape horizontal when switching from playback to the splice or record mode. The circuit comprising the emitter follower 70 and the low frequency error amplifier 69 are included in the block 21 of FIG. 1 and are included in FIG. 2 only for purposes of clarification.

We claim:

1. In a recorder-reproducer having a movable member for recording a signal on and reproducing a signal from a record medium, the combination comprising:

means for comparing said signal reproduced from said medium by said member with a first reference signal to produce a first error signal according to the phase difference therebetween, means for controlling the movement of said member according to the high frequency component of said first error signal, means for generating a second error signal according to the low frequency components in said first error signal, signal generating means including a capacitor responsive to said second error signal to produce a third error signal according to the charge developed across said capacitor by said second error signal, means for generating a further signal according to the velocity of said member, means for comparing said third error signal and said further signal to produce a fourth error signal according to the phase difference therebetween, means for controlling the movement of said member according to said fourth error signal, means for comparing said further signal with a second reference signal to produce a fifth error signal according to the phase difference therebetween, and means to disconnect said third error signal generating means from said second error signal generating means and to couple said fifth error signal producing means to said third error signal generating means to maintain in response to said fifth error signal the charge on said capacitor for a given duration as it was at the time said disconnect means disconnects said third error signal generating means from said second error signal generating means, said disconnect means further operating to disable said first-mentioned controlling means upon the disconnection of said second error signal generating means from said third error signal generating means, whereby said third error signal remains substantially the same as it was at the time said disconnect means disconnects said second error signal generating means from said third error signal generating means.

2. In a recorder-reproducer as claimed in claim 1, wherein:

said disconnect means includes an error amplifier including a lead-lag network responsive to said fifth error signal for amplifying said fifth error signal with a phase determined by said network, said disconnect means operating to apply said amplified fifth error signal to said third error signal generating means upon disconnecting said second error signal generating means from said third error signal generating means.

3. In a recorder-reproducer as claimed in claim 2, wherein:

said error amplifier includes a transistor in a common collector configuration having its base electrode coupled to said fifth error signal producing means and its emitter electrode coupled to a lead-lag network to provide a compensating phase to said fifth error signal, said error amplifier also including a differential amplifier having its input coupled to said emitter electrode, a second lead-lag network coupled to said differential amplifier to provide with said first network a desired compensating phase to said fifth error signal, said disconnect means operating to couple the output of said differential amplifier to said third error signal generating means upon disconnecting said second error signal generating means from said third error signal generating means.

4. In a television signal transverse scan recorder-reproducer of the type including a rotating headwheel and a headwheel servo for maintaining sync lock between a reference horizontal sync signal and the reproduced tape horizontal sync signal by driving said headwheel from a tonewheel phase detector circuit responsive to tonewheel pulses and to an error signal developed according to the phase difference between said reference horizontal sync and said reproduced tape horizontal sync, said headwheel servo including a storage device which maintains an instantaneous charged condition according to said error signal applied thereto, the improvement comprising:

means responsive to said tonewheel pulses and to a second reference signal to produce a second error signal according to the phase difference therebetween, a phase compensating amplifier for amplifying said second error signal, and switching means including a high impedance path for determining the charge on said storage device according to said second error signal instead of according to said first error signal to maintain in said storage device the charge condition last developed therein in response to said first error signal.

5. In combination:

means for generating a first reference signal at a first frequency, means for reproducing a control signal from a moveable recording medium upon which said control signal is recorded upon relative motion between said reproducing means and said recording medium, means for comparing said first reference signal and said control signal to produce a first error signal corresponding to the phase difference therebetween, filtering means responsive to said low frequency components of said error signal to provide a low frequency error signal, first variable delay signal generating means, including a capacitor, responsive to the amplitude of said low frequency error signal to provide a delayed signal according to the charge developed across said capacitor by said low frequency error signal, means for generating a second control signal indicative of the relative motion between said reproducing means and said recording means, means responsive to said second control signal and said delayed signal to produce a second error signal corresponding to the phase difference therebetween, means responsive to said second error signal for controlling the phase of said control signals, by controlling said relative motion, means for generating a second reference signal, at a second frequency, a second variable delay generator responsive to said second reference signal at said second frequency for providing a second delayed reference signal, means for generating a third control signal representative of the relative motion between said reproducing means and said recording means, means responsive to said second delayed reference signal and said third control signal to produce a third error signal corresponding to the phase difference therebetween, an error amplifier, including a lead-lag network, responsive to said third error signal for providing an amplified signal of a specified phase according to the action of said lead lag network, means coupling said error amplifier to said first variable delay means including said capacitor in a splicing mode to provide a charge to said capacitor indicative of said third error signal while further retaining for a desired duration any charge on said capacitor due to the action of said low frequency control signal whereby said second error signal is primarily determined by said third error signal to control said relative motion between said reproducing means and said recording means.

6. Apparatus for switching a recorder/reproducer employing a rotating headwheel type tape scan from a playback mode to a splicing mode, in which in the playback mode the headwheel's speed is synchronized by means of a headwheel servo controlled by an error voltage representing the low frequency components present in a signal corresponding to the phase difference between a reference horizontal signal and a horizontal signal recorded on the tape, comprising:

means for generating a second reference signal, a generator responsive to said second reference signal for delaying said signal a specified amount, means for generating a control signal corresponding to the speed of said headwheel, a monostable multivibrator responsive to said control signal to provide a delayed pulse corresponding to said headwheel's speed, a trapezoidal generator coupled to said monostable multivibrator and responsive to said delayed pulse to provide a trapezoidal signal corresponding to said headwheel's speed, comparison means having an output for providing an error signal between said trapezoidal signal and said delayed second reference signal, a first transistor in a common collector configuration having its base electrode coupled to said comparison means output, said transistor's emitter circuit coupled to a lead lag network to provide a compensating phase to said error signal, a differential amplifier having one input terminal coupled to said first transistor's emitter and an output for providing an accurate amplified error signal, said differential amplifier further having a second lead lag network coupled to it to provide with said first network a further compensating phase to said error signal, means capable of being switched from a playback to a splice mode coupled to said differential amplifier's output for causing said headwheel servo to control said headwheel according to said phase compensated error signal in said splicing mode, said means comprising means to maintain any previous charge on said memory capacitor due to said playback mode for a duration necessary to maintain synchronism during the switching to said splicing mode.

References Cited

UNITED STATES PATENTS

| | | | |
|---|---|---|---|
| 3,277,236 | 10/1966 | Machein et al. | 318—314 |
| 3,356,921 | 12/1967 | Bradford et al. | 318—314 |
| 2,905,876 | 9/1959 | Hillman | 318—327 |
| 3,017,462 | 1/1962 | Clark et al. | |
| 3,409,736 | 11/1968 | Hurst et al. | |

ROBERT L. GRIFFIN, Primary Examiner

D. E. STOUT, Assistant Examiner

U.S. Cl. X.R.

179—100.2; 318—314